United States Patent
Wulms

(10) Patent No.: US 9,067,480 B2
(45) Date of Patent: Jun. 30, 2015

(54) WINDING MECHANISM FOR A SUNSCREEN, SAID SUNSCREEN AND ROOF ASSEMBLY

(71) Applicant: Inalfa Roof Systems Group B.V., Venray (NL)

(72) Inventor: Johnny Elizabertus Anna Wulms, Maasbree (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 13/728,972

(22) Filed: Dec. 27, 2012

(65) Prior Publication Data

US 2014/0014757 A1    Jan. 16, 2014

(30) Foreign Application Priority Data

Dec. 28, 2011 (DE) ................ 20 2011 052 505 U

(51) Int. Cl.
*B60J 7/08* (2006.01)
*B60J 7/00* (2006.01)

(52) U.S. Cl.
CPC ............ *B60J 7/085* (2013.01); *B60J 7/0015* (2013.01)

(58) Field of Classification Search
CPC ............................ B60J 7/0015; B60J 7/085
USPC ............ 296/214; 160/370.22, 23.1, 313–318, 160/310, 191, 192
See application file for complete search history.

(56) References Cited

U.S. PATENT DOCUMENTS

| | | | | |
|---|---|---|---|---|
| 3,763,916 | A | * | 10/1973 | Gossling .................. 160/318 |
| 5,543,194 | A | * | 8/1996 | Rudy ........................ 428/69 |
| 5,908,673 | A | * | 6/1999 | Muhlberger ................ 428/17 |
| 7,243,699 | B2 | | 7/2007 | Ganser et al. |
| 8,210,230 | B2 | * | 7/2012 | Glasl ........................ 160/318 |
| 8,256,492 | B2 | * | 9/2012 | Lin ........................ 160/370.22 |
| 2008/0073039 | A1 | * | 3/2008 | Gyngell et al. ........... 160/313 |

FOREIGN PATENT DOCUMENTS

| | | |
|---|---|---|
| DE | 20011452 | 12/2001 |
| DE | 102004030262 | 6/2004 |
| DE | 202005007135 | 10/2005 |
| DE | 202005016889 | 2/2006 |

OTHER PUBLICATIONS

Search Report of the German Patent Office in counterpart foreign application No. 202011052505.8 filed Jun. 27, 2012.

* cited by examiner

*Primary Examiner* — Dennis H Pedder
(74) *Attorney, Agent, or Firm* — Steven M. Koehler; Westman, Champlin & Koehler, P.A.

(57) ABSTRACT

A winding mechanism for a sunscreen for use in an open roof construction for a vehicle includes a winding tube which is rotatable around a central axis of rotation for winding and unwinding the sunscreen. At least one spring member biases the winding tube in a direction for winding the sunscreen thereon. A sleeve protects the spring member from causing noises and is manufactured of a flexible layered material, having at least a first and a second layer connected to each other and having different properties so that the layer in contact with the spring is wear resistant and the other layer has an elastic ability.

25 Claims, 4 Drawing Sheets

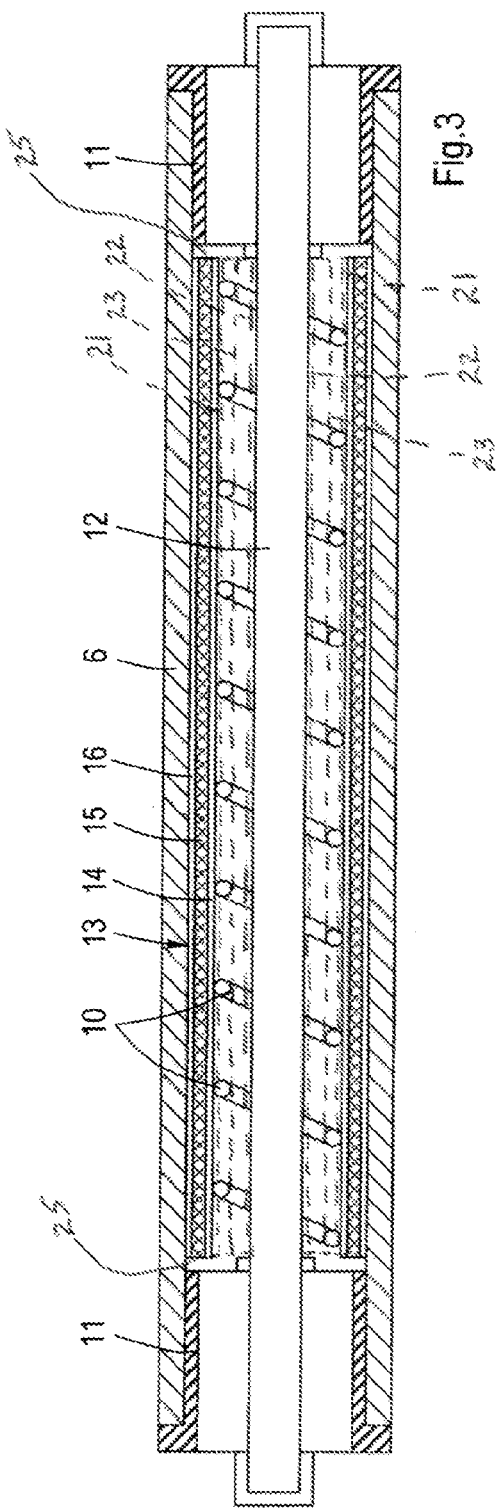
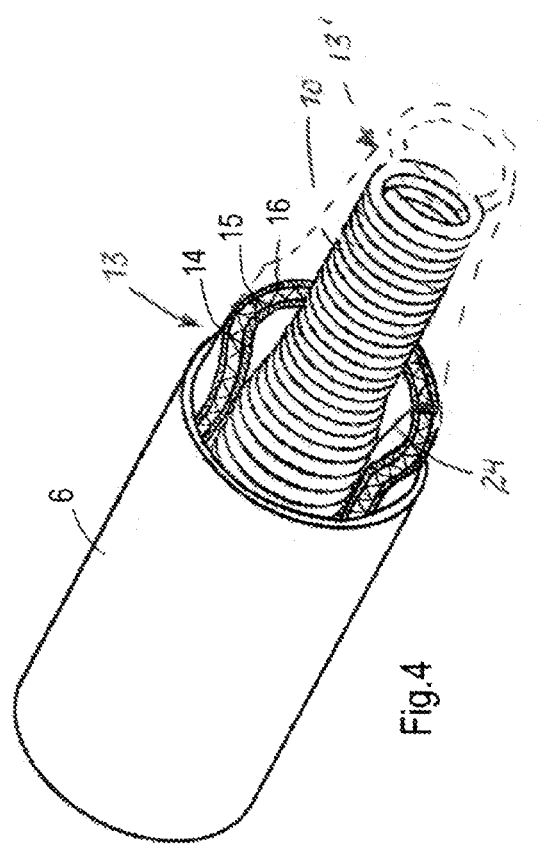

WINDING MECHANISM FOR A SUNSCREEN, SAID SUNSCREEN AND ROOF ASSEMBLY

BACKGROUND

The discussion below is merely provided for general background information and is not intended to be used as an aid in determining the scope of the claimed subject matter.

Aspects of the present invention relate to a winding mechanism for a sunscreen, for use in an open roof construction for a vehicle comprising a winding tube, being rotatable around a central axis of rotation for winding and unwinding the sunscreen, at least one spring member, for biasing the winding tube in a direction for winding the sunscreen thereon, and a sleeve for protecting said spring member from causing noises.

In prior art sunscreens having a winding mechanism (also known as rollo sunscreens) the spring member, mostly a metal helical torsion spring, is covered by a sleeve preventing the spring member from touching the winding tube. When no sleeve is used, the spring member will rattle or scrape against the inner surface of the winding tube resulting in an unpleasant noise for the users of the vehicle. Such noises can occur when the winding mechanism is operated but also when the vehicle makes certain movements. The prior art sleeves are made of a layer of cloth or rubber like plastic material. However, these sleeves do not fulfill the requirements to a sufficient extent. First of all, it turned out that the sleeves are not sufficiently resistant to wear. Often, the sleeve becomes damaged after a period of use and then starts to rattle within the winding tube. Furthermore the prior art sleeves are not able to dampen the more severe rattling movements of the helical spring member when it is tensioned (wound) and, due to it, has a decreased diameter and thus has more play within the winding tube.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the winding mechanism according to the invention comprises a sleeve that is manufactured of a flexible layered material, having at least a first and a second layer interconnected to each other and having different properties. Due to the layers having different properties, it is possible to provide the sleeve with different properties on the inner and outer side of the sleeve so as to be able to meet different requirements.

For example, the first layer of the flexible sleeve is at least incidentally, preferably substantially continuously, in contact with the spring member, and wherein said first layer has a high resistance to wear and a low coefficient of friction in relation to the spring member. In this manner, the first layer enables that the flexible sleeve will not shift in any lateral or radial direction relative to said spring member under influence of movements of the metal spring member due to its low coefficient of friction. This will reduce wear, which will be further reduced by the high resistance to wear of the first layer. If the sleeve is elastic in at least one of its axial and radial directions, it may follow expansion and retraction movements of the spring member without moving with respect thereto. Still a further reduction of wear will be obtained if the first layer of the flexible sleeve is substantially stiff in a direction along its surface. Due to this feature, the sleeve is not being caught between any part of the spring member thereby preventing or at least reducing damage to the sleeve.

It is advantageous if the second layer is made of dampening material having a dampening effect on physical forces or impacts applied to either of the inner or outer surface of the sleeve.

Thus, the second layer is used to provide anti-rattling properties to its dampening properties. The second layer may have a thickness which is greater than that of the first layer, and wherein said second layer can have a three dimensional open structure. In this way, the sleeve can still prevent rattling, also when the gap between the spring member and sleeve or another part increases.

It is even possible that a third layer is connected to the second layer, on a side opposite to the first layer, thus covering the second layer from both sides and protecting it against wear.

The flexible layered material of the sleeve may be manufactured from one thread, woven in such a pattern so as to form said at least two layers, whereas it is possible that the second layer comprises a foam incorporated in the woven pattern of the thread to further improve the dampening effect.

The sleeve may be applied to at least one of either of the spring member, an internal surface of the winding tube, and a shaft forming the central rotation axis, and it might be preferred that the sleeve comprises a plurality of individual longitudinal sleeve parts, which are applied to the spring member, the internal surface of the winding tube and the shaft.

In one embodiment, the sleeve is made of at least one rectangular piece of flexible layered material, said rectangular piece having opposite longitudinal edges and transversal edges, said longitudinal edges being substantially longer than said transversal edges, and wherein said opposite longitudinal edges are connected to each other by means of a welding or a gluing operation such that a cylindrical sleeve is created.

An aspect of the invention also includes a sunscreen assembly comprising the winding mechanism as described above, and a roof assembly comprising this sunscreen assembly.

BRIEF DESCRIPTION OF THE DRAWINGS

Further details and advantages of the invention follow from the description below with reference to the drawings showing an example of a roof assembly having a sunscreen including a winding mechanism.

FIG. 3 is a longitudinal sectional view of the winding mechanism of the sunscreen of FIG. 2 on a larger scale.

FIG. 4 is a perspective view of the partially cut-away winding mechanism of FIG. 3.

DETAILED DESCRIPTION OF THE ILLUSTRATIVE EMBODIMENTS

Figure 1:
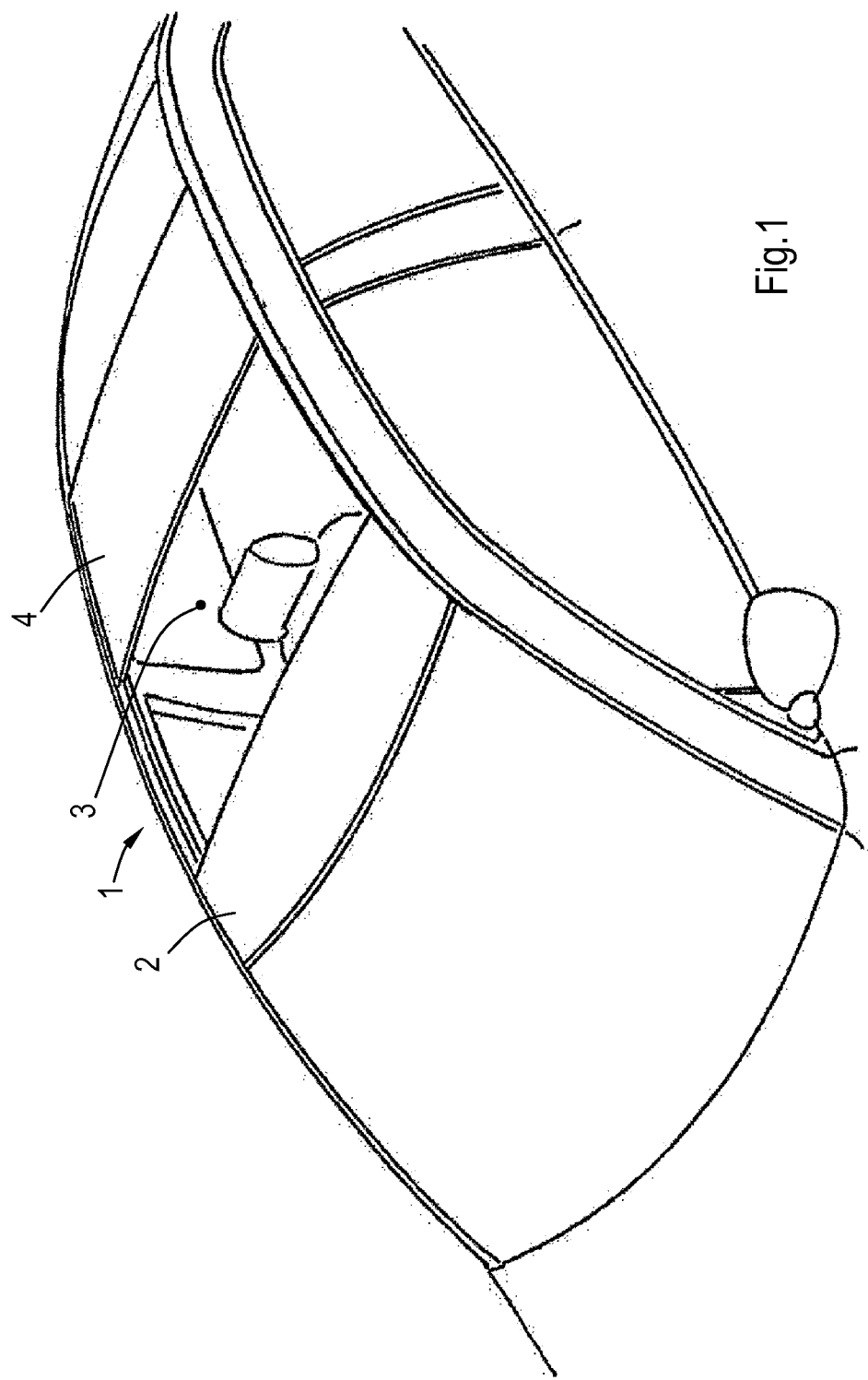
FIG. 1 is a schematic perspective view of a part of a vehicle having a roof assembly.

Referring firstly to FIG. 1, a part of a vehicle 1 is illustrated which is provided with a roof assembly. As illustrated, there is a roof opening 3 defined in a stationary roof part 2 of the vehicle 1. At least one movable closure member, here an at least partially transparent, rigid panel 4, is provided for opening and closing said roof opening 3.

Figure 2:
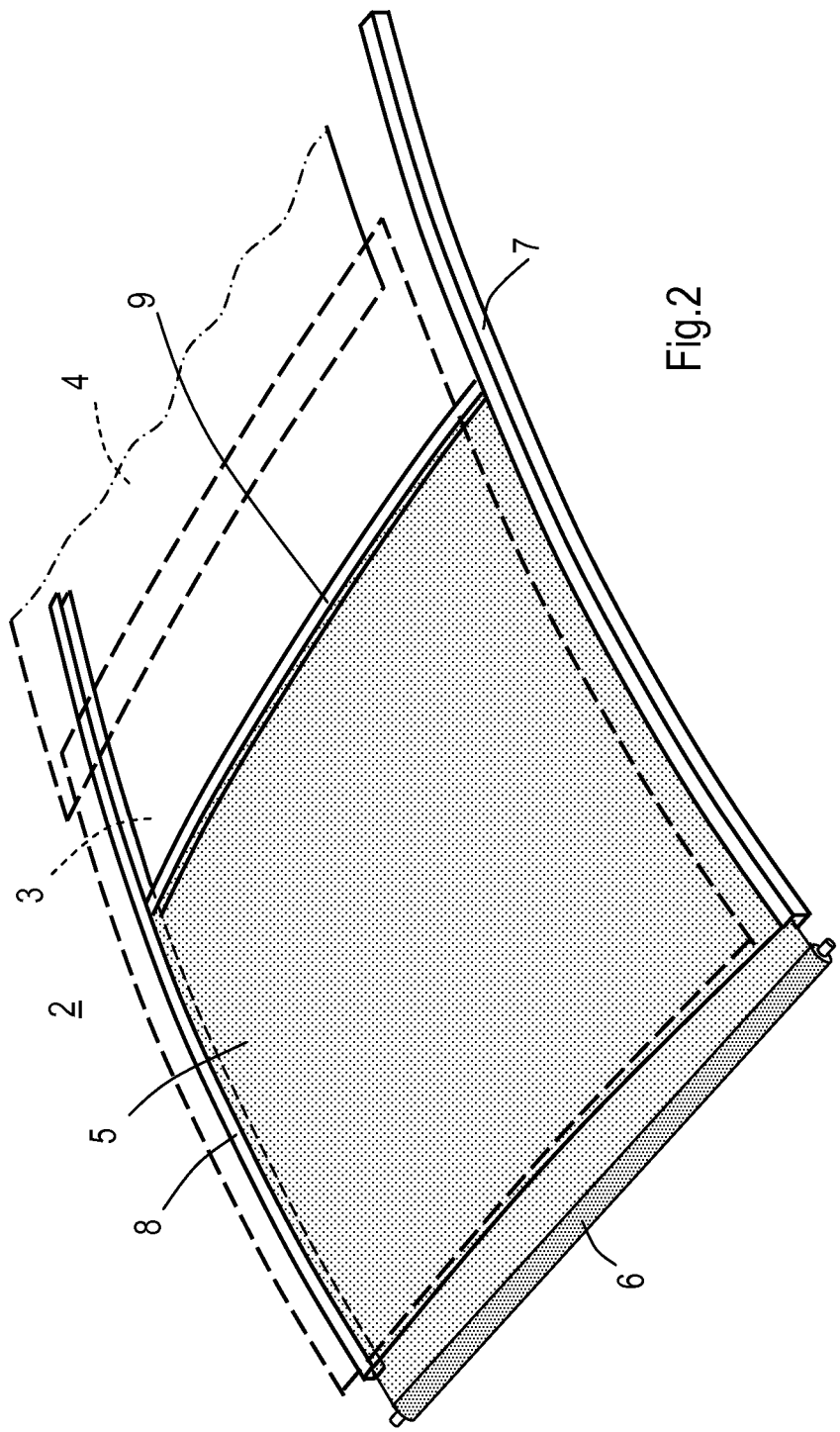
FIG. 2 is a schematic perspective view of a sunscreen assembly for the roof assembly of FIG. 1 and having a winding mechanism.

FIG. 2 illustrates a rollo assembly cooperating with said roof opening 3 for covering the roof opening 3 from below to keep the sun partly or completely out of the vehicle compartment. The rollo assembly basically comprises a flexible sun screen 5, a rotatable winding tube 6 for winding on or off the flexible sun screen 5 and two elongate guide members 7, 8 for cooperation with respective ones of longitudinal side edges of the sun screen 5. A transversal edge of the sun screen 5 remote from the winding tube 6 is provided with an operating beam 9 extending between the guides 7 and 8, which operating beam 9 in a manner known per se may be moved along said guides 7, 8 for moving the sun screen 5 while winding the latter on or off the winding tube 6 which is provided with biasing or tensioning means, such as an internal torsion spring.

FIG. 3 illustrates the winding tube 6 and a metal, in particular steel helical torsion spring 10 as a biasing device, the axis of which coincides with the axis of the winding tube 6. The spring 10 engages the winding tube 6 and a fixed part so as to build up a torsional force on the winding tube 6 when the sunscreen 5 is unwound from the winding tube 6, in order to enable the winding tube 6 to wind the sunscreen 5 again. The winding tube 6 has bearing members 11 and a rotary shaft 12 to enable the winding tube 6 to rotate around its axis of rotation.

As is shown in FIGS. 3 and 4, a sleeve 13 is provided or disposed between the spring 10 and the inner surface of the winding tube 6 and is substantially continuously in contact with the spring 10. The sleeve 13 prevents the spring 10 from making rattling noises within the winding tube 6. Stated another way, the sleeve 13 inhibits most if not all direct contact of the spring member 10 with the winding tube 6. The sleeve 13 comprises at least two and in this case three layers: a first or inner layer 14, a second or middle layer 15 and a third or outer layer 16. At least the first and second layer 14, 15 have different properties.

In this case the first and third layer 14, 16 are made of the same material, for example a polyester, and are designed to be wear and torque resistant, to have a low coefficient of friction, be flexible and elastic to follow movements of the spring 10, but stiff in a direction along its circumferential surface in order to prevent the first layer from being caught between the windings of the spring 10.

In the illustrated embodiment, the second or middle layer 15 has a greater thickness than the other layers 14, 16 and can be advantageously made of a 3D woven mesh which has the ability to swell back to its original thickness after it has been stretched or elongated, in this way creating elastic ability. With this property it is possible to absorb the differences in spring diameter and impacts and still hold the spring 10 tight, preventing it from rattling. The first and third layer 14, 16 protect the second layer 15 from becoming damaged.

The second layer 15 may be woven from one thread in a 3D structure, and one or more foam members may be incorporated in the weave, if desired. It is possible that all layers 14-16 are woven together to form an integral part, but with different properties because the layers 14-16 are woven in a different manner. The layers 14-16 may however also be manufactured separately and then interconnected.

Figure 5:
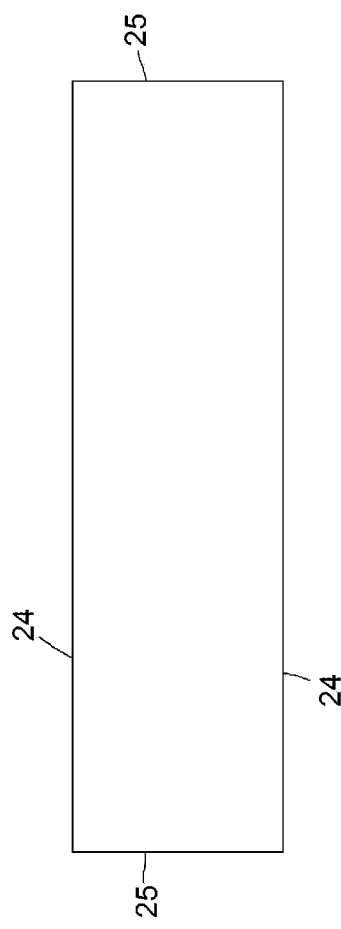
FIG. 5 is a view of a rectangular sheet that may be formed into a sleeve.

The sleeve 13 is made of at least one rectangular piece of flexible layered material as shown in FIG. 5. This rectangular piece have opposite longitudinal edges and transversal edges, said longitudinal edges being substantially longer than said transversal edges, and wherein said opposite longitudinal edges are connected to each other by means of a welding or a gluing operation such that a cylindrical sleeve 13 is created. The welding operation forms a weld where at least some of the material forming each of the longitudinal edges bonds or fuses together, which can be due to melting or softening of the material and subsequent hardening (at least partially) where the material from each of the edges is joined together. Gluing can include the use of an adhesive to join the longitudinal edges together. In FIG. 4, the joined longitudinal edges are illustrated at 24, while transversal edges are indicated at 25 in FIG. 3.

The sleeve 13 may have a varying diameter along its length, for example the ends of the sleeve 13 may be made with a smaller diameter or be otherwise narrowed so as to engage around the ends of the spring member 10 and thus to thereby keep the sleeve 13 in position with respect to the spring member 10. This is schematically illustrated in FIG. 4 by portion 13' illustrated with dashed lines.

In the drawing, the sleeve 13 is made in one piece, but it may also be made from several individual sleeve parts, which may be applied to any or all of the or otherwise disposed between parts within the winding tube 6, i.e. the inner surface of the winding tube 6, the spring member 10 (represented by dashed lines 21 and/or 22, or dashed lines 21 and/or 23) or the shaft 12 (represented by dashed line 22). Thus it can prevent rattling between any parts of the winding mechanism.

Figure 6:
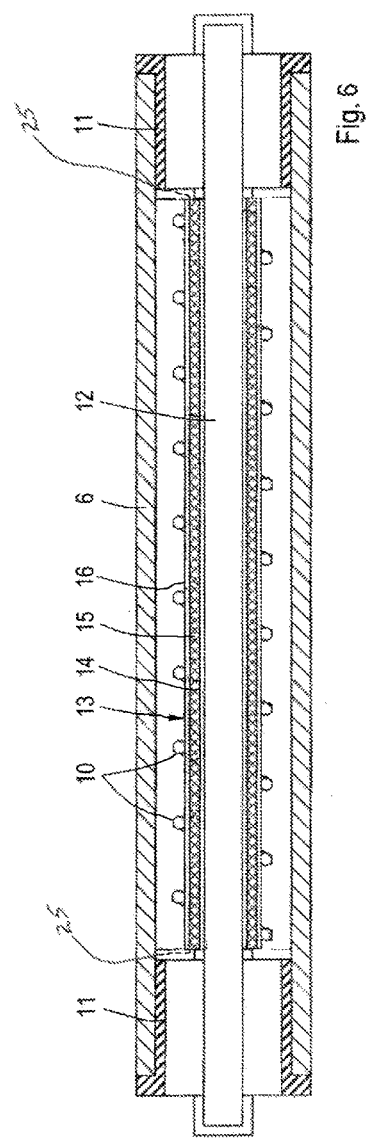
FIG. 6 is a longitudinal sectional view of the winding mechanism of the sunscreen of FIG. 3 with the sleeve shown between the spring and the shaft.

Aspects of the invention are not limited to the embodiments shown in the drawing and described above, but can be varied within the scope of the appended claims. Thus, other springs may be used in the winding mechanism and also the winding tube 6 may be replaced by another part. The sleeve 13 may be provided on the shaft 12 in other words so as to engage an outwardly facing surface of the shaft, or stated another way inwardly of the spring member 10 (as shown in FIG. 6).

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A winding mechanism for a sunscreen, for use in an open roof construction for a vehicle, comprising:
   a winding tube being rotatable around a central axis of rotation configured to wind and unwind the sunscreen;
   at least one spring member configured to bias the winding tube in a direction for winding the sunscreen thereon; and
   a sleeve configured to engage the spring member and inhibit noise from the spring member, wherein the sleeve comprises a flexible layered material, having at least a first and a second layer connected to each other and having different properties;
   wherein the flexible layered material of the sleeve is manufactured from one thread, woven in such a pattern so as to form said at least two layers.

2. The winding mechanism of claim 1, wherein the first layer of the flexible sleeve is at least incidentally in contact with the spring member, and wherein said first layer has a high resistance to wear and a low coefficient of friction in relation to the spring member, such that said flexible sleeve will not shift in any lateral or radial direction relative to said spring member under influence of movements of the spring member.

3. The winding mechanism of claim 1, wherein the first layer of the flexible sleeve is substantially stiff in a direction along its surface.

4. The winding mechanism of claim 1, wherein the second layer is made of dampening material having a dampening effect on physical forces or impacts applied to either an inner or outer surface of the sleeve.

5. The winding mechanism of claim 4, wherein the second layer has a thickness which is greater than that of the first layer.

6. The winding mechanism of claim 1, wherein a third layer is connected to the second layer, on a side opposite to the first layer.

7. The winding mechanism of claim 1, wherein the second layer comprises a foam incorporated in the woven pattern of the thread.

8. The winding mechanism of claim 1, wherein the sleeve surrounds the spring member.

9. The winding mechanism of claim 1, and further comprising:
   a shaft extending longitudinally within the winding tube; and
   wherein the sleeve is positioned between the shaft and the winding tube.

10. The winding mechanism of claim 1, wherein the central axis of rotation comprises a shaft, the sleeve positioned around the shaft.

11. The winding mechanism of claim 1, wherein the sleeve comprises a plurality of individual longitudinal sleeve parts.

12. The winding mechanism of claim 1, wherein the sleeve is made of at least one rectangular piece of flexible layered material, said rectangular piece having opposite longitudinal edges and transversal edges, said longitudinal edges being substantially longer than said transversal edges, and wherein said opposite longitudinal edges are joined together such that a cylindrical sleeve is created.

13. The winding mechanism of claim 1, wherein the sleeve has a varying diameter along its length.

14. The winding mechanism of claim 13 wherein ends of the sleeve have a smaller diameter than a portion between the ends.

15. The winding mechanism of claim 1, wherein the spring member is a metal spring.

16. The winding mechanism of claim 1, wherein the spring member is a helical spring.

17. The winding mechanism of claim 1, wherein the sleeve is elastic in at least one of its axial and radial directions.

18. The winding mechanism of claim 1, and further comprising a sunscreen with an end secured to the winding tube, the sunscreen being configured to be wound upon and unwound from the winding tube.

19. The winding mechanism of claim 1, wherein the first layer of the flexible sleeve is substantially continuously in contact with the spring member.

20. A rollo assembly comprising:
   a winding tube being rotatable around a central axis;
   a shaft extending longitudinally within the winding tube;
   at least one spring member configured to bias the winding tube in a direction for winding the sunscreen thereon;
   a sleeve disposed between the spring and the shaft, wherein the sleeve comprises a flexible layered material, having at least a first and a second layer connected to each other and having different properties, wherein the second layer is made of dampening material having a dampening effect on physical forces or impacts applied to either an inner or outer surface of the sleeve, and wherein said second layer has a three dimensional open structure configured to dampen movement of the spring member;
   a flexible panel with an end secured to the winding tube, the panel being configured to be wound upon and unwound from the winding tube; and
   a pair of guides configured to guide opposite edges of the panel as the panel is wound upon and unwound from the winding tube; and
   a beam secured to an end of the panel remote from the end secured to the winding tube, the beam extending transversely between the guides.

21. The rollo assembly of claim 20, wherein the first layer of the flexible sleeve is at least incidentally in contact with the spring member, and wherein said first layer has a high resistance to wear and a low coefficient of friction in relation to the spring member, such that said flexible sleeve will not shift in any lateral or radial direction relative to said spring member under influence of movements of the spring member.

22. The rollo assembly of claim 20, wherein the first layer of the flexible sleeve is substantially stiff in a direction along its surface.

23. The rollo assembly of claim 20, wherein the sleeve has a varying diameter along its length.

24. The rollo assembly of claim 20, wherein a third layer is connected to the second layer, on a side opposite to the first layer.

25. The rollo assembly of claim 20, wherein the sleeve is made of at least one rectangular piece of flexible layered material, said rectangular piece having opposite longitudinal edges and transversal edges, said longitudinal edges being substantially longer than said transversal edges, and wherein said opposite longitudinal edges are joined together such that a cylindrical sleeve is created.

* * * * *